United States Patent [19]

Matthew et al.

[11] Patent Number: 4,515,696

[45] Date of Patent: May 7, 1985

[54] TREATMENT OF SOLUTIONS TO FACILITATE THE REMOVAL OF FERRIC IRON THEREFROM

[75] Inventors: Ian G. Matthew, Dynnyrne; Robert V. Pammenter; Mervyn G. Kershaw, both of Lindisfarne, all of Australia

[73] Assignee: Electrolytic Zinc Company of Australasia Limited, Victoria, Australia

[21] Appl. No.: 473,526

[22] Filed: Mar. 9, 1983

[30] Foreign Application Priority Data

Mar. 24, 1982 [AU] Australia ............... PF3282

[51] Int. Cl.³ ............................... C02F 1/54
[52] U.S. Cl. ............................ 210/713; 210/725; 210/727
[58] Field of Search ............ 210/724, 725, 726, 727, 210/712, 713, 716, 738, 702, 96.1, 743, 745

[56] References Cited

U.S. PATENT DOCUMENTS

| | | | |
|---|---|---|---|
| 3,226,319 | 12/1965 | Schick | 210/714 |
| 4,069,152 | 1/1978 | Specken | 210/728 |
| 4,126,550 | 11/1978 | Doerschlag | 210/743 |
| 4,192,852 | 3/1980 | Pammenter et al. | 423/106 |
| 4,269,706 | 5/1981 | Sondermann | 210/738 |
| 4,329,224 | 11/1982 | Kim | 210/724 |

FOREIGN PATENT DOCUMENTS 401724 3/1970 Australia.
487596 10/1977 Australia.
517492 11/1981 Australia.

*Primary Examiner*—Barry S. Richman
*Assistant Examiner*—John Donofrio
*Attorney, Agent, or Firm*—Larson and Taylor

[57] ABSTRACT

A process for treatment of an acidic solution containing ferric iron and at least one non-ferrous metal, prior to removal of ferric iron therefrom, is characterized by adding a specified amount of at least one neutralizing agent, and separating off from the solution any residue or undissolved neutralizing agent remaining after neutralization, thereby producing a solution possessing an acid consuming capacity termed "negative acidity", and still containing substantially all the dissolved ferric iron in solution, and from which ferric iron can subsequently be removed with the generation of less acid compared to that generated from solutions partially neutralized according to the prior art.

28 Claims, No Drawings

TREATMENT OF SOLUTIONS TO FACILITATE THE REMOVAL OF FERRIC IRON THEREFROM

This invention relates to treatment of acidic solutions containing ferric iron, prior to removal of ferric iron therefrom.

Treatment of the said solutions in accordance with the invention enables the removal of ferric iron to be achieved with significant improvements compared with the prior art.

In a general aspect the invention provides a process in which a solution containing acid and ferric iron is treated by addition of a neutralizing agent to reduce the level of acid prior to removal of ferric iron from the solution.

In a further aspect the invention concerns solutions which have been neutralized to have an acid consuming capacity as determined using a method hereinafter defined and which for convenience is hereinafter termed negative acidity.

According to the invention in a principal embodiment there is provided a process in which a solution containing acid, ferric iron and non-ferrous metals is treated by the addition of a neutralizing agent prior to the removal of ferric iron, including removal by precipitation as a basic iron salt, jarosite, goethite, ferric hydroxide, ferric oxide, or related compounds, characterised by—

(1) adding at least one neutralizing agent in amounts such that the total amount added lies in the range $X_1$ to $X_2$ grams per liter of the said solution, where—

$$X_1 = [(A - 3.0) + 0.088 (F_1 + F_2)]/N,$$

$$X_2 = [(A - 0.1) + 2.20 (F_1 + F_2)]/N,$$

A = acidity (expressed as grams per liter) of the said solution,
$F_1$ = ferric iron (grams per liter) in the said solution,
$F_2$ = ferric iron (grams per liter) dissolved from the neutralizing agent or agents added during the neutralization, and
N = the weighted average amount of acid which can be neutralized by one gram of the neutralizing agent or agents added during the neutralization, and (2) separating off from the solution any residue or undissolved neutralizing agent remaining after neutralization, thereby producing a solution possessing a negative acidity and still containing substantially all the dissolved ferric iron in solution and from which ferric iron can subsequently be removed with the generation of less acid compared to that generated from solutions partially neutralized according to the prior art.

The invention may include any of the following preferred embodiments.

The initial solution contains between 0.1 and 250 grams of acid per liter, 0.1 and 100 grams of ferric iron per liter, and more than 2 grams of a valuable non-ferrous metal or metals per liter.

The initial solution is a sulphate solution containing 0.1 to 250 grams of acid per liter, 0.1 to 100 grams of ferric iron per liter, and at least 20 grams of zinc per liter, as well as non-ferrous metal impurities such as cadmium, copper, nickel and cobalt, derived from a step in the electrolytic zinc process.

The initial solution is a sulphate solution derived from the hot acid leaching step of the electrolytic zinc process.

At least one of the neutralizing agents is drawn from a group containing zinc oxide, zinc oxide calcine, calcined zinc sulphide, calcined zinc sulphide concentrate, basic zinc sulphate, zinc silicate, smithsonite, an oxidised zinc ore, lime, limestone, dolomite, solids from the neutral leach step in the electrolytic zinc process and releached solids from the aforesaid neutral leach step.

The neutralization is operated in one stage.

The neutralization is operated in more than one stage prior to separation of the solids from the solution Different neutralizing agents are added.

Different neutralizing agents are added to the different stages of neutralization.

More than one neutralizing agent is added to at least one of the different stages of neutralization.

The solids from the neutral leaching step of the electrolytic zinc process and zinc oxide calcine are used as the neutralizing agents and are added together to the first stage of the neutralization process, and at least one member of the group zinc oxide, zinc oxide calcine, calcined zinc sulphide and calcined zinc sulphide concentrate is used as the neutralizing agent in the second stage.

The solids are separated off between two of the stages of neutralization.

The solids from a later stage of neutralization are recycled as a neutralizing agent to an earlier stage of neutralization.

The concentrations of acid A and ferric iron $F_1$ are adjusted to allow for the amounts present in other solutions added to the initial solution before or during neutralization.

The neutralization is carried out at a temperature in the range 15° C. to the boiling point of the solution.

The acidity after neutralization lies in the range 0 to −50 grams of acid per liter.

The acidity after neutralization lies in the range 0 to −30 grams of $H_2SO_4$ per liter.

A flocculating agent is added before, during or after neutralization to facilitate separation of solids from the solution.

The flocculating agent used is a nonionic flocculant.

The neutralization is carried out in two or more stages and flocculants are added to more than one of the stages.

Residues or undissolved neutralizing agent or agents remaining after neutralization are separated from the solution by at least one of the procedures of settling, thickening, hydrocycloning, centrifuging, filtering, and screening.

The neutralization is carried out batchwise.

The neutralization is carried out in a continuous manner.

The neutralization is carried out in more than one stage and at least one stage is carried out batchwise and at least one stage is carried out in a continuous manner.

The solution after neutralizing is treated to precipitate the ferric iron as a jarosite with the addition of a neutralizing agent to aid precipitation.

The solution after neutralizing is treated to precipitate the ferric iron as a jarosite without the addition of a neutralizing agent.

The solution after neutralizing is treated to precipitate the ferric iron as ferric oxide or as a hydroxy compound of ferric iron, such as goethite or ferric hydroxide.

The solution after neutralizing is treated to remove the ferric iron by solvent extraction.

BACKGROUND OF THE INVENTION

Many valuable non-ferrous metals occur as ores or minerals in conjunction with iron in various forms. Examples are nickel, often present as a sulphide such as pentlandite or in an oxidised form in laterites; copper, often present as sulphides such as chalcopyrite, or bornite or in an oxidised form as chrysocolla; and zinc, often present as a sulphide in association with pyrites or in an oxidised form as willemite. These ores are treated directly by pyrometallurgical or hydrometallurgical methods or they are upgraded, especially by flotation in the case of sulphides, to form concentrates. The concentrates are then treated to recover the valuable non-ferrous metals. The ores, minerals or concentrates, particularly if they consist primarily of sulphides, are generally roasted to form an oxide product, hereinafter termed calcine, which is then treated hydrometallurgically to recover the valuable non-ferrous metals.

In many cases the hydrometallurgical treatment involves a leach of the ore, mineral, concentrate, or calcine, to dissolve the valuable metal or metals. Various types of leaching techniques are known to those skilled in the art. They may involve acidic, neutral, or alkaline solutions, containing suitable oxidizing or reducing agents if required.

During leaching in acid solutions it is common for iron to be dissolved simultaneously with the valuable non-ferrous metal or metals, and to report into the leaching solution as ferric iron. Sometimes this ferric iron must be removed from the solution before the valuable non-ferrous metal or metals can be recovered. In some other cases the ferric iron may be removed after the valuable non-ferrous metal has been recovered and before the solutions are recycled for re-use.

The electrolytic zinc process can be cited as an example to demonstrate the type of procedures involved. Typically, zinc sulphide ores are treated by flotation to form a zinc sulphide concentrate which in addition to zinc sulphide, normally contains some iron and frequently small amounts of other valuable non-ferrous metals such as lead, cadmium, copper, silver and gold. When the zinc sulphide concentrate is subjected to an oxidising roast to form a zinc oxide calcine there is a reaction between some of the iron and the zinc in the concentrate to form a zinc ferrite of the type $ZnFe_2O_4$. When the calcine is leached in dilute acid, the zinc oxide dissolves as zinc sulphate but leaves the ferrite in the solid residue. This represents a loss of zinc, and in the past this ferrite residue was either stockpiled or treated by pyrometallurgical methods. When the ferrite residue is leached with acid at elevated temperatures both the zinc and the iron are solubilised, and the ferric iron must be removed from the solution before the zinc can be recovered by electrolysis. During the leaching processes other minor valuable metals, such as copper and cadmium, are also dissolved.

In recent years several techniques have been suggested for separating the iron from the leach solution containing ferric iron and the valuable metal or metals. The most widely accepted is the well known Jarosite Process (Australian Pat. No. 401724) in which the ferric iron is precipitated as a complex basic iron sulphate of the form, $MFe_3(SO_4)_2(OH)_6$ where M is $H_3O^+$, $NH_4^+$, $Na^+$ or $K^+$. The Jarosite Process has been well established in the electroyltic zinc industry. Iron is also separated from solution as a jarosite in the cobalt industry (see for example, Aird, J., Celmar, R. S., and May, A. V., "New Cobalt Production from R.C.M.'s Chambishi Roast - leach - electrowin Process", Mining Magazine, October 1980, pages 320–326). Precipitation of ferric iron as jarosite has also been suggested for use in the recovery of nickel from laterites (see for example Australian Pat. No. 517492). The ferric iron may also be recovered from solution as compounds of undisclosed form, but probably a compound similar to ferric oxide or goethite (see Australian Pat. No. 424095 and South African patent application No. 75/2737). It may be precipitated as hematite (see for example Mealey, M., "Hydrometallurgy Plays a Big Role in Japan's New Zinc Smelter" in Engineering and Mining Journal, January 1973, pages 82–84). The ferric iron may even be removed from the solution by solvent extraction (see Australian Pat. No. 487596).

In all the examples cited above, the leach solution treated for removal of ferric iron contains some acid in addition to the ferric iron and the valuable non-ferrous metal or metals. The amount of acid is normally adjusted to a concentration which depends upon the methods subsequently used to precipitate the iron.

In the Jarosite process, the acid content of the solution leaving the leaching step and entering the jarosite precipitation must be at least 20 grams of $H_2SO_4$ per liter according to the paper by Wood, J. T., entitled "Treatment of Electrolytic Zinc Plant Residues by the Jarosite Process" Australian Mining, January 1973, pages 23–27, and this acid must be neutralized during the jarosite precipitation step of the process. Furthermore, jarosite is precipitated by a reaction of the type:

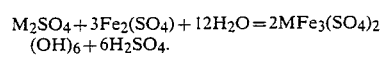

$$M_2SO_4 + 3Fe_2(SO_4) + 12H_2O = 2MFe_3(SO_4)_2(OH)_6 + 6H_2SO_4.$$

where M is one or more of $H_3O^+$, $NH_4^{30}$, $Na^+$ and $K^+$. The sulphuric acid liberated must also be neutralized to maximise the precipitation of jarosite. It is clear that to minimise the amount of neutralizing agent required, the acidity of the solution entering the jarosite precipitation step must be as low as possible. Traditionally it has not been possible to reduce the acidity below 30 g/l because of the formation of jarosite which ultimately reports in the lead - silver residue produced as a by-product, and this is a particularly undesirable feature.

In those processes where a neutralizing agent is added during the ferric iron precipitation stage, such as in the conventional Jarosite Process or where ferric iron is precipitated as ferric oxide, geothite, or related compounds the neutralizing agent is frequently the ore or mineral treated, or the calcine containing the oxidised valuable non-ferrous metal or metals. The residues from these neutralizing agents also contain valuable non-ferrous metals and these are then discarded with the iron waste. This represents a substantial loss of valuable raw materials, and a process which is capable of significantly reducing the amount of neutralizing agent required by reducing the acidity of the feed solution would enable great savings to be made. Where a different neutralizing agent is used, such as limestone, lime or ammonia, a reduction in the amount of neutralizing agent required would represent a considerable saving in costs.

When the iron is precipitated as ferric oxide, goethite, or related compounds by reactions of the type:

$$Fe_2(SO_4)_3 + (x+3)H_2O = Fe_2O_3 \cdot xH_2O + 3H_2SO_4$$

and $$Fe_2(SO_4)_3 + 4H_2O = 2FeOOH + 3H_2SO_4$$

where x is a number $\geq 0$, acid is again liberated during the precipitation reaction and, as in the Jarosite Process, this acid must be neutralized together with the acid present in the initial solution. Where these techniques are used to precipitate ferric iron, the solutions contain much lower levels of ammonium, sodium or potassium ions, and the risk of premature precipitation of iron is not as great. As a result, the acidity of these solutions can be lower than that of solutions in the Jarosite Process. The examples in Australian Pat. No. 424095 show that an acidity as low as 15.5 g/l can be achieved. The claims specify a solution with a pH of less than 1.5. Nevertheless, it is obvious to one skilled in the art that to minimise the quantity of neutralizing agent required when the ferric iron is precipitated, the acidity of the initial solution must be as low as possible.

In the case where ferric iron is removed from the solution by solvent extraction, it is clear from the results in the paper by Van der Zeeuw, A. J., entitled "Purification of Zinc Calcine Leach Solutions by Exchange Extraction with the Zinc Salt of 'Versatic' Acid", published in Hydrometallurgy, volume 2, 1976/1977, pages 275-284, that the acid present in the solution is extracted at the same time as the ferric iron, and it is intuitively obvious to one skilled in the art that the amount of organic solvent required to treat a given volume of solution containing ferric iron and valuable metal or metals will be reduced if the initial acidity is reduced.

The recent invention of the Low-contaminant Jarosite Process (Australian Pat. No. 506591) teaches a method for reducing the acidity of a solution to within the range of 0.1 to 30 g/l H₂SO₄ by cooling before the addition of a neutralizing agent, thereby reducing the risk of jarosite being precipitated during the so-called preneutralization step. However, it is apparent from the data presented in Table 1 of the paper by Pammenter, R. V., and Haigh, C. J., entitled "Improved Metal Recovery by the Low-contaminant Jarosite Process", Extraction Metallurgy '81, published by The Institute of Mining and Metallurgy, London, 1981, that for the best operation of the process the acidity of the solution should be as low as possible. The same paper also states that for the best operation of preneutralization, the acidity should be between 3 and 5 grams of H₂SO₄ per liter (see page 4 of the paper).

In those processes where no neutralizing agent is required in the ferric iron removal step, such as the Low-contaminant Jarosite Process, or where ferric iron is precipitated from solution at high temperature and pressure, or where the iron is removed from an acidic solution by solvent extraction, a reduction in the acidity of the solution entering the iron removal step is advantageous to the process, as indicated by reference to the prior art.

There is thus the need for a new procedure which achieves a lower acidity in the solution containing ferric iron and valuable non-ferrous metals than is currently possible. There is an even greater advantage to be gained if a process could be found which would decrease the amount of acid generated during the ferric iron removal step, as this would decrease the amount of neutralizing agent to be added, where such neutralizing agents are required.

DETAILED DESCRIPTION OF INVENTION

The applicants have found that it is possible to neutralize the acidity of a solution containing ferric iron such that the acidity of the solution after the adjustment demonstrates the characteristics of a negative value. This is achieved by adding to the solution a suitable neutralizing agent or agents in amounts calculated depending upon the concentration of ferric iron and acid in the solution, and on the nature of the neutralizing agent.

According to the invention in a principal embodiment there is provided a process in which a solution containing acid, ferric iron and non-ferrous metals is treated by the addition of a neutralizing agent prior to the removal of ferric iron, including removal by precipitation as a basic iron salt, jarosite, goethite, ferric hydroxide, ferric oxide, or related compounds, characterised by—

(1) adding at least one neutralizing agent in amounts such that the total amount added lies in the range $X_1$ to $X_2$ grams per liter, of the said solution where—

$$X_1 = [(A - 3.0) + 0.088 (F_1 + F_2)]/N,$$

$$X_2 = [(A - 0.1) + 2.20 (F_1 + F_2)]/N,$$

A = acidity (expressed as grams per liter) of the said solution,
$F_1$ = ferric iron (grams per liter) in the said solution,
$F_2$ = ferric iron (grams per liter) dissolved from the neutralizing agent or agents added during the neutralization, and
N = the weighted average amount of acid which can be neutralized by one gram of the neutralizing agent or agents added during the neutralization, and (2) separating off from the solution any residue or undissolved neutralizing agent remaining after neutralization, thereby producing a solution possessing a negative acidity and still containing substantially all the dissolved ferric iron in solution and from which ferric iron can subsequently be removed with the generation of less acid compared to that generated from solutions partially neutralized according to the prior art.

In this description of the invention the term "acidity" is the concentration of acid measured by a titration performed according to the following method.

(1) Measure a 5 milliliter portion of the solution containing ferric iron and acid of unknown strength into a 250 milliliter beaker.

(2) Add to this 10 milliliters of a solution containing 750 grams of potassium iodide per liter.

(3) Add dropwise a solution of sodium thiosulphate until all coloration of iodine is lost. Add a few drops of extra thiosulphate solution.

(4) Dilute to 100 milliliters with distilled water.

(5) Titrate with a standard 0.1 normal solution of caustic soda (NaOH) while measuring the pH of the solution being titrated. When the pH=3.9 note the volume of caustic soda solution added.

(6) Calculate the normality of the acid from the formula.

$$\text{Normality of Acid} = \frac{0.1 \times \text{Volume of NaOH solution added in milliliters}}{5.0}$$

The acidity can then be calculated in grams per liter by multiplying the calculated normality by the equivalent weight of the acid being titrated.

The acidity of a solution displaying a negative acidity is measured by a similar method, but firstly a 5 milliliter portion of a solution containing a known concentration of acid is added to the beaker together with the 5 milliliter sample of the solution containing ferric iron and the unknown negative acidity. The titration is then carried out as previously described and the total combined acidity of the two solutions, one of known acidity and the other of unknown negative acidity, is then determined. The acidity of the solution of unknown negative acidity is then calculated from the total combined acidity and the acidity of the solution of known acidity. The result is termed the negative acidity.

For example, a typical result in sulphate media may show a total combined acidity of 6 grams of $H_2SO_4$ per liter of the combined 5 milliliter aliquots following the addition of a solution containing 20 grams of $H_2SO_4$ per liter. The amount of acid in the unknown solution would then be the total acid present in the combined sample (10 milliliters at 6 grams of $H_2SO_4$ per liter) less the acid added (5 milliliters at 20 grams of $H_2SO_4$ per liter). The concentration is then determined by dividing the amount of acid by the volume of the sample (5 milliliters).

i.e. Amount of acid $= \frac{10 \times 6}{1000} - \frac{5 \times 20}{1000}$ grams of $H_2SO_4$ $= \frac{-40}{1000}$ grams of $H_2SO_4$ Concentration of acid $= \frac{-40}{1000} \div \frac{5}{1000}$ grams of $H_2SO_4$ $= -8$ grams of $H_2SO_4$ per liter Solutions with ferric iron concentrations over a wide range can be treated by the process of the present invention. In the electrolytic zinc process, one solution would be a solution from the hot acid leaching of a zinc ferrite residue, and could be expected to contain between 15 and 30 grams of ferric iron per liter. In the Low-contaminant Jarosite Process the procedure might be practised on the solution before or after the jarosite precipitation step, and since some dilution may be practised in the Low-contaminant Jarosite Process the range of ferric iron applicable would be typically between 3 and 30 grams of ferric iron per liter. If the material being leached has a high iron content, then the level of ferric iron in the solution could be substantially higher. Similarly, the process could be applied to solutions containing very low levels of ferric iron. For example in the applicants electrolytic zinc plant a solution containing about 0.25 g/l ferric iron is neutralized to pH 5.2 to precipitate the contained iron. This solution could be treated by the process of the present invention before neutralization to pH 5.2.

The levels of ferric iron in solution produced during nickel processing are likely to fall within the same range as for zinc refining. Australian Pat. No. 517492 refers to a concentration of about 6 grams of $Fe^{3+}$ per liter in a solution containing sulphates of nickel and iron.

In the article entitled "The Sulphation of Nickel Ores" by J. H. Canterford in the Proceedings of the International Laterite Symposium, published by the Society of Mining Engineers, AIME., 1979, the concentration of ferric iron in solution after leaching nickel laterites was in the range 5–30 g/l (see page 645).

In the treatment of solutions containing copper or cobalt, the levels of ferric iron in solution are likely to be fairly low, but this would depend upon the method used for leaching. This is because oxide ores, minerals, and calcines are frequently leached under conditions of fairly low acidity (for example Aird, J., Celmer, R. S., and May, A. V., "New Cobalt Production from R.C.M.'s Chambishi Roast - leach - electrowin Process", Mining Magazine, October 1980, pages 320–326).

Thus the range of ferric iron concentrations applicable to solutions to be treated by the process of the present invention is from less than 0.25 g/l to well over 50 g/l though these figures are not limiting. From practical considerations the range will be about 0.1 grams of ferric iron per liter to 100 grams of ferric iron per liter.

The initial concentration of acid in the solutions to be treated by the process of the present invention will depend upon the source of the solution. In a plant operating the conventional Jarosite Process there are likely to be two sources of solution:

(a) from the hot acid leaching step, where the acidity will probably be in the range 40–60 grams of $H_2SO_4$ per liter, or (b) from a conventional preneutralization step at high temperature, where the acidity will probably be in the range 30–50 grams of $H_2SO_4$ per liter.

These acidity limits are governed by the risk of precipitating jarosite in the hot acid leaching or preneutralization steps when alkali metal ions (such as ions of ammonium, sodium, or potassium) are present.

In the Low-contaminant Jarosite Process the solution to be treated by the process of the present invention will typically have an acidity of 40 to 60 grams of $H_2SO_4$ per liter if it is from the hot acid leaching step, 0.1 to 5 grams of $H_2SO_4$ per liter if it is from the preneutralization step, or 10 to 30 grams of $H_2SO_4$ per liter if it is from the jarosite precipitation step.

In those processes where the iron is removed by some method other than by precipitation of ferric iron as a jarosite the solutions will contain very low levels of $NH_4^{30}$, $Na^+$, or $K^+$ and the level of acid in the solution will depend upon the preceding process steps. A hot acid leach step may produce a solution with an acidity in the range 15 to 50 grams of $H_2SO_4$ per liter, while a preneutralization step could produce a solution with a pH 1.5. The acidity of a solution with this pH value would be of the order of 3 grams of $H_2SO_4$ per liter.

Thus, the acidities of solutions treated by the process of the present invention will normally lie in the range 0.1 to 60 grams of acid per liter, though this range is not limiting. There are no technical reasons why a solution from a hot strong acid leaching stage, with an acidity in the range 100 to 250 grams of acid per liter, could not be treated. From practical considerations the range of acidities will be 0.1 to 250 grams of acid per liter.

The amount of neutralizing agent to add to the solution containing iron and acid depends upon the initial concentration of both. Care must obviously be taken not to add too much neutralizing agent as this could result in the precipitation of undesirable ferric iron compounds. Too small an addition would result in insufficient neutralization. The actual mass to add is a function of the neutralizing power of the neutralizing agent (expressed as grams of acid neutralized per gram of neutralizing agent). Although we do not wish to be limited by any postulated or hypothetical mechanism for the observed beneficial results, we believe that an important concept underlying the present invention is the discovery that the amount of neutralizing agent which can be added to the solution is more than the amount theoretically required to react with all the acid shown by the titration to be present and this extra amount is dependent upon the ferric iron concentrations of the solution. The effect of this extra addition of neutralizing agent is to impart to the solution the characteristics of a negative acidity. When these solutions with negative acidities are processed to remove the ferric iron content, such as by precipitating the ferric iron as a jarosite, a portion of the acid liberated by the precipitation reaction is, in effect, neutralized by the solution itself. Thus, for a given amount of iron precipitated, the amount of acid generated, i.e. liberated to the solution, is lowered by the amount of the negative acidity of the solution, where the negative acidity is determined by the method described earlier.

It is this ability to produce a solution with a negative acidity by the addition of a calculated amount of neutralizing agent which is a principal feature of this invention. When such solutions are treated to remove their ferric iron content by precipitation, less acid is generated during the precipitation reaction, and where a neutralizing agent is added to aid the precipitation, the amount to be added is significantly decreased. In the electrolytic zinc process this leads to a significant decrease in the losses of valuable metals in the ferric iron precipitate. In the Low-contaminant Jarosite Process, the present invention leads to a significant improvement in the removal of ferric iron during the jarosite precipitation step.

If the neutralizing agent contains soluble ferric iron this must be taken into account when calculating the amount of neutralizing agent to add, since the level of the negative acidity is dependent upon the ferric iron content of the solution. The total amount of neutralizing agent is that amount required to neutralize the desired amount of acidity plus that required to generate the desired negative acidity. The concentration of alkali metal ions in the group $NH_4^+$, $Na^+$ and $K^+$ may be important, as solutions containing these ions are more likely to suffer premature precipitation of undesirable ferric iron compounds (jarosites), and in these solutions the addition of neutralizing agents may have to be minimised. With solutions containing little or no $NH_4^+$, $Na^+$ or $K^+$ ions, the addition of neutralizing agent can be increased, and the negative acidity which can be achieved without problems of premature precipitation of ferric iron can also be increased.

A wide range of neutralizing agents can be used in the process of the present invention. These include zinc oxide, zinc oxide calcine formed by the oxidizing roast of zinc sulphide concentrate, copper oxide, calcined copper sulphide, red mud from the alumina process, zinc silicate, smithsonite, oxidised zinc ore, basic zinc sulphate, or some other basic salt of a valuable non-ferrous metal, lime, limestone, dolomite, magnesia, or a soluble basic salt such as caustic soda, soda ash and caustic potash. One particularly useful neutralizing agent in the context of the electrolytic zinc process is the solids produced in the neutral leaching step of the electrolytic zinc process. These solids contain a variety of neutralizing species such as excess zinc oxide, ferric hydroxide, aluminium hydroxide, and basic zinc sulphate. This list of neutralizing agents is not limiting.

These neutralizing agents may be used singly or in combination. The neutralizing may be undertaken in one stage or in two or more stages. It may be advantageous to separate any solid residues formed by this neutralizing agents from the solution between two or more of the stages of neutralization.

A feature of the invention is that the same or different neutralizing agents may be added to the different stages of the neutralization procedure, and two or more different neutralizing agents could be added to the same stage. One preferred embodiment of the invention is to perform the neutralization in two stages, with solids from the neutral leach step of the electrolytic zinc process and zinc oxide calcine added together to the first stage of the process, followed by the addition of zinc oxide calcine to the second stage.

A major feature of the invention is the calculation of the amount of neutralizing agent to be added, based on the neutralizing power of the neutralizing agents used. If two or more solutions are added during the neutralization procedure the values of $A$ and $F_1$ must be adjusted to allow for the amounts of acid and ferric iron present in all solutions added to the neutralization step.

After the neutralization procedure of the present invention any residues formed from the neutralizing agent or agents are then separated from the solution which has a lower acidity than solutions produced according to the prior art. This solution can then be treated to eliminate the majority of the ferric iron by precipitation as jarosite or a hydrolysed ferric iron species with the generation of less acid compared to solutions treated according to the prior art.

The temperature at which the neutralization is carried out is not limiting. From a practical consideration the maximum temperature may be regarded as the boiling point of the solution at normal atmospheric pressure. The minimum temperature may be regarded as 15° C., again only from practical considerations. However, the important feature in relation to temperature is its effect on the maximum permissible residence time due to the possible precipitation of ferric iron compounds during the neutralization. The tendency for precipitation increases with increasing temperature. Thus, the residence time at high temperature should be as short as possible to avoid significant precipitation of ferric iron compounds and the maximum allowable residence time will be a function of the temperature.

In addition, the more negative is the acidity, the more unstable is the resultant solution, and the more likely is the precipitation of ferric iron compounds during neutralization. Thus the allowable residence time is also a function of the amount of neutralizing agent added, being reduced as the acidity becomes more negative. When the process of the present invention is operated in a sulphate system, the presence of ammonium, sodium, and potassium ions is also of importance as they accentuate the precipitation of undesirable ferric iron compounds, namely jarosites, during neutralization. The allowable residence time therefore decreases with an increase in the concentration of ammonium, sodium and potassium ions in a sulphate solution.

The minimum residence time for the process is the time required for the neutralizing agent or reagents to react. This will depend upon the materials and the temperature—the higher the temperature the more rapid the rate of reaction. The minimum residence time may be as short as a few seconds.

The final negative acidity achieved by the application of the process will depend upon the concentration of ferric iron in the initial solution, the amount of ferric iron dissolved from the neutralizing agent, and the amount of neutralizing agent added. It is likely to lie in the range 0 grams of acid per liter, to a negative free acidity of −50 grams per liter, with the preferred range being 0 to −30 grams of acid per liter.

Another feature of the present invention is the separation off from the solution of the residues formed from the neutralizing agent and any unreacted neutralizing agent. If these residues contain valuable non-ferrous metals, they can be returned to the acid leaching step which would normally be expected to be the source of the solutions treated by the process of this invention. This ensures that losses of valuable metals are minimised. Any solid liquid separation means known to those skilled in the art can be used, such as thickeners, settlers, hydrocyclones, centrifuges, filters, or screens. It is beneficial for this separation to be performed as rapidly as possible to minimise the precipitation of ferric iron compounds into the residues.

The addition of flocculants before, during or after neutralization is beneficial to the separation of solids and liquids. We have found that nonionic polyacrylamide flocculants give the best results. The flocculant may be added at one or many points in the neutralization process, including the tank holding the neutralizing agent, and a number of different flocculants, such as different nonionic types, or anionic plus nonionic or cationic plus nonionic, or any combination may be used in conjunction with one another. This use of flocculants to aid separation is also a feature of the invention. We have found it particularly advantageous to add a nonionic flocculant to each tank in the train of vessels used in the neutralization rather than add the flocculant after the neutralization is complete. The latter practice is the one conventionally recommended for flocculation. However, by increasing the degree of agitation in the tanks it has been found to be possible to minimise the number of tanks to which flocculant is added. With increased agitation, appropriate choice of flocculants and their addition rate, satisfactory operation is certainly possible with the flocculant added to the last reactor tank and a subsequent small flocculation tank or alternatively with the flocculant added to two small flocculation tanks with none to the reactor tanks. It must be noted that the distinction between a reactor tank and a flocculation tank is somewhat arbitrary as neutralization may continue to occur, even though at a diminished rate, right up to the point where the solids are liquids are separated. The type of flocculant or flocculants used and the point of addition during the neutralizing procedure is of paramount importance to ensure a good separation of residues and solution after neutralization. This is demonstrated by Example 8, where the addition of flocculant was changed, and the clarity of the separated solution was measured using a solution clarity indicator.

The process may be operated batchwise or continuously, and if more than one stage of neutralization is used, one or more of these stages could be operated continuously or batchwise. Furthermore, if more than one stage of neutralization is used in the process, the solids from the neutralizing agent added to a later stage may be recycled to act as a neutralizing agent in an earlier stage of the process.

The operation and benefits of the new process are demonstrated by the following non-limiting examples.

Example 1 shows the results of the operation of the new process over a range of different initial acid and ferric iron levels, temperatures, and neutralizing agents.

Examples 2–5 show the benefits of the new process.

Example 6 shows the operation of the process at high temperature.

Example 7 demonstrates the effect of increasing residence time.

Example 8 demonstrates the effect of flocculant addition on the separation of solids and solution.

It is clear from the examples that there are major operational benefits to be gained when the process of the present invention is used in conjunction with the removal of ferric iron from solution by precipitation.

EXAMPLE 1

The Operation of the New Process with Various Neutralizing Agents, Treating a Sulphate Solution Containing Acid, Ferric Iron, and Zinc Sulphate A series of four tanks, each of 300 milliliters capacity and fitted with an agitator, was arranged to test the process of the present invention. The tanks were heated by hot ethylene glycol circulated through a jacket around each tank, and the temperature in each tank was controlled by adjusting the flow of the ethylene glycol.

Neutralization was normally carried out in 2 stages, and neutralizing agents were added to the first and third tanks. The flows of solution and neutralizing agents were measured and controlled, and the residence time during neutralization calculated from these flows. The feed solutions were analysed, as were the solutions after separation of the residues from the treated solution.

Five neutralizing agents were tested, namely neutral leaching solids, zinc oxide calcine, basic zinc sulphate, pure zinc oxide, and washed basic zinc sulphate. The neutralizing powers of these materials, in grams of $H_2SO_4$ neutralized per gram of neutralizing agent were respectively 0.5 g/g, 0.8 g/g, 0.2 g/g, 1.2 g/g and 0.35 g/g. These figures are derived in the following manner: Let $C_1$ be the initial acidity of the solution in grams $H_2SO_4$ per liter, and $C_2$ the final acidity after addition of M grams of neutralizing agent per liter (provided that $C_2$ is greater than zero). It is apparent that $(C_1-C_2)$ grams $H_2SO_4$ has been neutralized by M grams of neutralizing agent. The neutralizing power N of the neutralizing agent is therefore:

$N=(C_1-C_2)/M$ gms per gm.

The sample of washed basic zinc sulphate was produced from the original material by washing it with water to reduce the gypsum content, and was used in one test. In this and subsequent examples the term calcine will be used as an abbreviation for zinc oxide calcine produced by calcining zinc sulphide concentrate, unless otherwise stated.

The results of the tests are shown in Table 1. It is seen that in each case, with the exception of Test 15, the amount of neutralizing agent lies in the specified range $X_1$ to $X_2$, and in each case, with the exception of Test 15, a zero or negative acidity was achieved in the final solution. In Test 15 X was =69.9 g/l, which was less than $X_1$, the low range point, calculated to be 82 g/l. As a result a final negative acidity was not achieved.

In this series of tests, Tests 11 and 12 were performed with a single stage addition of calcine, while Tests 13, 14, 15 and 16 were performed with separation of liquids and solids between the two stages of neutralization.

The full neutralizing power of a neutralizing agent is not always fully utilized in the process. Test 6 is an example. In this event, the excess neutralizing agent is removed in the solids separation step.

TABLE 1

| Test Number | Analysis of Feed Solution | | Temperature °C. | Approx. Reaction Time Minutes | Neutralizing Agent to Stage 1 | | Neutralizing Agent to Stage 2 | |
|---|---|---|---|---|---|---|---|---|
| | $Fe^{3+}$ g/l ($F_1$) | $H_2SO_4$ g/l (A) | | | Type* | Amount Added g/l | Type* | Amount Added g/l |
| 1 | 28.4 | 47.6 | 64.3 | 16.7 | 1 | 63.0 | 1 | 20.7 |
| 2 | 24.0 | 50.6 | 65 | 18.7 | 1 | 62.8 | 4 | 25.4 |
| 3 | 24.0 | 50.6 | 65 | 21.1 | 1 | 83.7 | 2 | 67.0 |
| 4 | 22.8 | 46.8 | 65 | 19.7 | 2 | 219.9 | 2 | 26.0 |
| 5 | 22.8 | 46.8 | 65 | 19.3 | 2 | 229.3 | 2 | 42.6 |
| 6 | 22.8 | 46.8 | 65 | 19.3 | 2 | 238.8 | 2 | 21.3 |
| 7 | 25.0 | 48.2 | 65 | 18.5 | 3 | 43.6 | 3 | 23.0 |
| 8 | 25.0 | 49.2 | 65 | 18.7 | 3 | 38.5 | 3 | 36.7 |
| 9 | 25.0 | 49.2 | 65 | 18.6 | 3 | 38.5 | 3 | 41.3 |
| 10 | 25.0 | 49.2 | 65 | 18.6 | 3 | 39.6 | 3 | 36.7 |
| 11 | 24.0 | 49.6 | 65 | 19.2 | 3 | 93.6 | Nil | — |
| 12 | 24.0 | 49.6 | 65 | 18.7 | 3 | 106.6 | Nil | — |
| 13 | 24.2 | 49.6 | 65 | 18.4 | 1 | 65.9 | 3 | 28.7 |
| 14 | 24.2 | 49.6 | 65 | 18.6 | 1 | 52.7 | 3 | 39.0 |
| 15 | 24.2 | 49.6 | 60 | 19.1 | 1 | 45.8 | 3 | 24.1 |
| 16 | 24.2 | 49.6 | 60 | 17.9 | 1 | 74.9 | 3 | 35.6 |
| 17 | 31.9 | 53.3 | 65 | 17.6 | 1 | 85.7 | 3 | 34.2 |
| 18 | 31.9 | 53.3 | 65 | 20.2 | 1 | 57.7 | 3 | 39.1 |
| 19 | 15.9 | 53.5 | 65 | 17.5 | 1 | 79.1 | 3 | 46.5 |
| 20 | 15.9 | 53.5 | 65 | 16.5 | 1 | 99.8 | 3 | 37.9 |
| 21 | 15.5 | 54.1 | 65 | 21.3 | 1 | 74.7 | 3 | 36.7 |
| 22 | 15.5 | 54.1 | 65 | 20.6 | 1 | 77.7 | 3 | 26.9 |
| 23 | 24.8 | 51.8 | 64 | 19.0 | 1 | 88.2 | 3 | 38.4 |
| 24 | 24.8 | 51.8 | 64 | 18.9 | 1 | 81.1 | 3 | 60.5 |
| 25 | 24.8 | 51.8 | 64 | 19.5 | 1 | 75.4 | 3 | 39.6 |
| 26 | 24.0 | 50.0 | 65 | 19.3 | 5 | 113.5 | 5 | 51.8 |
| 27 | 24.0 | 50.0 | 50 | 21.5 | 1 | 41.8 | 3 | 36.9 |
| 28 | 24.8 | 45.7 | 63 | 20.6 | 1 | 63.4 | 3 | 38.8 |
| 29 | 24.8 | 45.7 | 63 | 20.7 | 1 | 64.8 | 3 | 32.0 |
| 30 | 24.0 | 50.6 | 65 | 18.7 | 1 | 55.4 | 4 | 25.4 |
| 31 | 24.0 | 50.6 | 65 | 18.7 | 1 | 50.8 | 4 | 23.7 |
| 32 | 28.4 | 47.6 | 52.5 | 18.5 | 1 | 85.7 | 3 | 32.2 |
| 33 | 28.4 | 47.6 | 52.5 | 18.3 | 1 | 85.7 | 3 | 42.1 |
| 34 | 28.4 | 47.6 | 52.5 | 18.6 | 1 | 85.7 | 3 | 22.3 |
| 35 | 28.4 | 47.6 | 52.5 | 18.5 | 1 | 85.7 | 3 | 24.7 |

| Test Number | Weighted Average Neutralizing Power (N) g $H_2SO_4$/l | Ferric Iron Added by Neutralizing Agents g/l ($F_2$) | Addition of Neutralizing Agent | | Actual Addition g/l (X) | Final Acidity of Neutralized Solution g $H_2SO_4$/l |
|---|---|---|---|---|---|---|
| | | | Calculated Range | | | |
| | | | $X_1$ g/l | $X_2$ g/l | | |
| 1 | 0.574 | 5.7 | 83 | 213 | 83.7 | −9.0 |
| 2 | 0.702 | 8.7 | 72 | 174 | 88.2 | −0.6 |
| 3 | 0.367 | 8.8 | 138 | 334 | 150.7 | −13.7 |
| 4 | 0.2 | 0 | 229 | 484 | 245.9 | −5.3 |
| 5 | 0.2 | 0 | 229 | 484 | 271.9 | −9.8 |
| 6 | 0.2 | 0 | 229 | 484 | 260.1 | 0.0 |
| 7 | 0.8 | 0 | 61 | 130 | 66.0 | −2.1 |
| 8 | 0.8 | 0 | 61 | 130 | 75.0 | −9.2 |
| 9 | 0.8 | 0 | 61 | 130 | 79.8 | −8.6 |
| 10 | 0.8 | 0 | 61 | 130 | 76.3 | −5.3 |
| 11 | 0.8 | 0 | 61 | 128 | 93.6 | −0.4 |
| 12 | 0.8 | 0 | 61 | 128 | 106.6 | −8.6 |
| 13 | 0.591 | 7.5 | 84 | 202 | 94.6 | −9.4 |
| 14 | 0.628 | 6.2 | 79 | 185 | 91.7 | −11.0 |
| 15 | 0.603 | 6.6 | 82 | 195 | 69.9 | 1.0 |
| 16 | 0.597 | 9.9 | 83 | 209 | 101.5 | −6.1 |
| 17 | 0.586 | 13.3 | 93 | 261 | 119.9 | −7.8 |
| 18 | 0.611 | 6.0 | 88 | 224 | 96.8 | −12.0 |
| 19 | 0.611 | 10.0 | 86 | 181 | 125.6 | −4.5 |
| 20 | 0.583 | 12.1 | 91 | 197 | 137.7 | −6.3 |
| 21 | 0.599 | 7.9 | 89 | 176 | 111.4 | −7.8 |
| 22 | 0.577 | 5.2 | 92 | 173 | 104.4 | −8.8 |
| 23 | 0.591 | 3.1 | 85 | 191 | 126.6 | −11.4 |
| 24 | 0.628 | 0.6 | 81 | 171 | 141.6 | −12.2 |
| 25 | 0.603 | 0 | 85 | 176 | 115.0 | −7.8 |

TABLE 1-continued

| | | | | | | |
|---|---|---|---|---|---|---|
| 26 | 0.355 | 0 | 140 | 293 | 165.3 | −6.1 |
| 27 | 0.640 | 8.2 | 78 | 189 | 78.7 | −9.4 |
| 28 | 0.614 | 8.4 | 80 | 208 | 102.2 | −11.2 |
| 29 | 0.599 | 8.6 | 82 | 213 | 96.8 | −7.5 |
| 30 | 0.720 | 8.6 | 70 | 170 | 80.8 | −6.9 |
| 31 | 0.723 | 7.8 | 70 | 167 | 74.5 | −8.9 |
| 32 | 0.582 | 5.9 | 82 | 211 | 117.9 | −4.5 |
| 33 | 0.599 | 5.9 | 80 | 205 | 127.8 | −9.0 |
| 34 | 0.562 | 5.9 | 85 | 219 | 108.0 | −10.6 |
| 35 | 0.567 | 5.9 | 84 | 217 | 110.4 | −9.8 |

*Types of Neutralizing Agents
1 Neutral Leach Solids — Neutralizing Power = 0.5 g $H_2SO_4$/g.
2 Basic Zinc Sulphate — Neutralizing Power = 0.2 g $H_2SO_4$/g.
3 Zinc Oxide Calcine — Neutralizing Power = 0.8 g $H_2SO_4$/g.
4 Pure Zinc Oxide — Neutralizing Power = 1.2 g $H_2SO_4$/g.
5 Washed Basic Zinc Sulphate — Neutralizing Power = 0.35 g $H_2SO_4$/g.

EXAMPLE 2

The Use of the Process of the Present Invention to Reduce the Quantity of Zinc Oxide Calcine Required to Precipitate Ferric Iron as a Jarosite A sulphate solution obtained from the leaching of zinc plant residue was analysed to contain:
$Fe^{3+}$ = 31.9 g/l
$H_2SO_4$ = 40.0 g/l
Zn = 74.2 g/l
$NH_4$ = 2.6 g/l The ferric iron was then precipitated from a portion of this solution according to the process of Australian Patent No. 401,724. One liter of the solution was heated to 100° C., and to it was added 50 grams of jarosite seed, and to the resulting mixture was added a total of 142.5 grams of calcine over a period of 3 hours. At the end of this time the majority of the ferric iron had been precipitated as ammonium jarosite. The pulp was then flocculated with a nonionic flocculant and the solids filtered off. The filtrate contained:
$Fe^{3+}$ = 2.1 g/l
$H_2SO_4$ = 10.8 g/l
Zn = 139.4 g/l
$NH_4$ = 0.5 g/l The amount of ferric iron precipitated per gram of calcine was 0.209 grams.

A second portion of the sulphate solution was neutralized stagewise at 65° C. by the addition of calcine at 5 minute intervals according to the process of the present invention. The additions and the resulting acidities are as shown:
Addition 1: 47.5 grams of calcine per liter of solution. Resulting acidity = 13.6 g of $H_2SO_4$/l.
Addition 2: 30.0 grams of calcine per liter of solution. Resulting acidity = −0.8 g of $H_2SO_4$/l.
Addition 3: 25.0 grams of calcine per liter of solution. Resulting acidity = −12.1 g of $H_2SO_4$/l.
Addition 4: 10 grams of calcine per liter of solution.

A small addition (2.5 ppm w/v) of a nonionic flocculant was made after each calcine addition. After the fourth addition of calcine the residue was separated from the solution by decantation. The total reaction time was 20 minutes. The clear decanted solution contained:
$Fe^{3+}$ = 33.3 g/l
$H_2SO_4$ = −19.4 g/l
Zn = 120.7 g/l A one liter portion of this solution with a negative acidity was heated to 100° C. and to it was added 50 grams of jarosite seed, and 36 grams of calcine. The ferric iron rapidly precipitated as ammonium jarosite. After 3 hours a small amount of a nonionic flocculant was added, and the solids were separated from the solution by filtration. The filtrate was found to contain:
$Fe^{3+}$ = 2.1 g/l
$H_2SO_4$ = 10.4 g/l
Zn = 144.5 g/l
$NH_4$ = 0.4 g/l The quantity of ferric iron precipitated per gram of calcine was 0.867 grams. Thus the use of the process of the present invention has reduced the amount of calcine required to precipitate one gram of ferric iron from 1/0.209 grams i.e. 4.785 grams, to 1/0.867 grams i.e. 1.153 grams, a saving of 3.60 grams or 75.2% of the original amount of calcine required by the conventional jarosite process.

In this example:

| | |
|---|---|
| A | = 40 |
| $F_1$ | = 31.9 |
| $F_2$ | = 0 |
| N | = 0.556 |
| $X_1$ | = [(40 − 3) + 0.088 (31.9 + 0)]/0.556 |
| | = 72 grams of calcine per liter of solution |
| $X_2$ | = [(40 − 0.1) + 2.2 (31.9 + 0)]/0.556 |
| | = 198 grams of calcine per liter of solution |
| X | = actual addition, grams per liter of solution |
| | = 47.5 + 30.0 + 25.0 + 10.0 |
| | = 112.5 grams of calcine per liter of solution |

EXAMPLE 3

Reduction in the Quantity of Zinc Oxide Calcine Required During the Precipitation of Ferric Iron According to the Process of Australian Pat. No. 424095

A sulphate solution containing:

| | | | |
|---|---|---|---|
| $Fe^{3+}$ = | 23.3 g/l | Na = | 50 mg/l |
| $Fe^{2+}$ = | 1.3 g/l | $NH_4$ = | 23 mg/l |
| $H_2SO_4$ = | 1.6 g/l | K = | 50 mg/l |
| Zn = | 76.3 g/l | pH = | 1.43 | was prepared by leaching a zinc plant residue containing zinc ferrite in dilute sulphuric acid at 85° C. and adding a small amount of zinc calcine, to simulate the solutions used in the examples of Australian Pat. No. 424095.

775 milliliters of this sulphate solution was then pumped at approximately 20 ml/min to a stirred reactor containing 60 grams of zinc oxide calcine as a slurry in a zinc sulphate solution. The temperature of the pulp within the reactor was maintained at 75° C. on a thermostatically controlled hot plate. The ferric iron in the solution precipitated as a hydroxy compound of undefined composition.

After 38 minutes the $pH_{25}$ had fallen to 1.89, at which time the solids were flocculated with a nonionic polyacrylamide flocculant, settled and the solution was found to contain:

$Fe^{3+} = 3.5$ g/l
$Zn = 124.2$ g/l

The weight of iron precipitated per gram of calcine added during precipitation was 0.212 grams.

A portion of the sulphate solution containing 1.6 g $H_2SO_4$/l was reacted at 65° C. with 17.25 grams of calcine per liter of solution according to the process of the present invention to prepare a solution with a negative acidity. After stirring the solution with the calcine for 15 minutes, flocculating and decanting, the clear solution analysed:

$Fe^{3+} = 21.6$ g/l
$H_2SO_4 = -7.2$ g/l
$Zn = 77.9$ g/l 800 milliliters of this solution containing a negative acidity was pumped at 20 ml/min to a stirred reactor containing 47 g of calcine as a slurry in a zinc sulphate solution as before. The temperature of the pulp within the reactor was maintained at 75° C.

After 40 min the $pH_{25}$ had fallen to 1.89, and the pulp was then flocculated and decanted as described earlier in this example.

The analysis of the liquor was found to be:

$Fe^{3+} = 3.2$ g/l
$Zn = 117.6$ g/l

The weight of iron precipitated per gram of calcine added during precipitation was 0.265 grams.

Thus the use of the process of the present invention has reduced the amount of calcine required to precipitate one gram of ferric iron from 1/0.212 grams, or 4.717 grams to 1/0.265 grams, or 3.774 grams, i.e. a saving of 0.943 grams of calcine, or 20.0% of the calcine added according to the process of Australian Pat. No. 424095.

In this example:

| | | |
|---|---|---|
| A | = | 1.6 |
| $F_1$ | = | 23.3 |
| $F_2$ | = | 0 |
| N | = | 0.556 |
| $X_1$ | = | $[(1.6 - 3) + 0.0883 (23.3 + 0)]/0.556$ |
| | = | 1.2 grams of calcine per liter of solution |
| $X_2$ | = | $[(1.6 - 0.1) + 2.2 (23.3 + 0)]/0.556$ |
| | = | 95 grams of calcine per liter of solution |
| X | = | Actual calcine addition, grams per liter of solution |
| | = | 17.25 grams of calcine per liter of solution |

EXAMPLE 4

The Use of the Process of the Present Invention to Increase the Quantity of Ferric Iron Precipitated as Jarosite According to the Process of Australian Pat. No. 506591 (i.e. the Low-contaminant Jarosite Process)

A sulphate leach solution was prepared as for Example 2. This solution contained 33.1 g ferric iron/l and 37 g acid/l.

Neutral leach solids were prepared as a neutralizing agent by performing a simulated neutral leach by adding calcine to an acidic zinc sulphate solution containing ferric iron to neutralize its contained acid and to precipitate various impurity elements together with the iron. The neutral leach solids were separated by flocculation and thickening. The analysis of the solids in this pulp, which contained 158 grams of solids/liter of pulp, was:

$Zn = 22.2\%$
$Fe = 22.6\%$
$Pb = 3.2\%$

Neutralizing Power, $N = 0.526$ grams of $H_2SO_4$/g of solids.

One liter portions of the sulphate leach solution were heated to 65° C. and various amounts of the neutralizing agent added to the different portions of sulphate leach solution. After 15 minutes continuous stirring at 65° C., each pulp was flocculated with a nonionic flocculant, settled and decanted.

The analyses of the decant solutions are shown in Table 1 together with the values of A, $F_1$, $F_2$, $X_1$, $X_2$ and X.

TABLE 1

| Volume of Neutralizing Agent pulp added to the 1 liter leach solution | 340 ml | 680 ml | 820 ml |
|---|---|---|---|
| Composition of decant solution | | | |
| $H_2SO_4$ (g/l) | 7.3 | −7.5 | −7.9 |
| $Fe^{3+}$ (g/l) | 29.7 | 27.7 | 26.4 |
| $NH_4$ (g/l) | 2.8 | 2.7 | 3.0 |
| Zn (g/l) | 94.4 | 100.1 | 102.8 |
| Pb (mg/l) | 28 | 26 | 44 |
| $SO_4$ (g/l) | 301 | 283 | 282 |
| pH | 0.8 | 1.46 | 1.70 |
| X | 53.7 | 107.4 | 129.6 |
| $F_1$ | 33.1 | 33.1 | 33.1 |
| $F_2$ | 6.7 | 13.4 | 14.9 |
| A | 37 | 37 | 37 |
| N | 0.526 | 0.526 | 0.526 |
| $X_1 = [(A - 3.0) + 0.088 (F_1 + F_2)]/N$ | 71 | 72 | 73 |
| $X_2 = [(A - 0.1) + 2.2 (F_1 + F_2)]/N$ | 237 | 265 | 271 |

The decant solution was heated to 100° C. under reflux on a thermostatically controlled hot plate and 100 g of very pure ammonium jarosite seed material was added. The temperature was maintained for 5 hours with agitation being provided by a magnetic stirrer.

The effect of neutralizing the leach solution to a negative acidity upon the precipitation of ferric iron as ammonium jarosite is shown below:

| Volume of Neutralizing Agent added to the 1 liter of leach solution | 340 ml | 680 ml | 820 ml |
|---|---|---|---|
| Analysis of solution at start of precipitation | | | |
| $H_2SO_4$ | 7.3 g/l | −7.5 g/l | −7.9 g/l |
| $Fe^{3+}$ | 29.7 g/l | 27.7 g/l | 26.4 g/l |
| % of $Fe^{3+}$ precipitated in time (hour) | | | |
| 1 | 17.8 | 53.1 | 19.7 |
| 2 | 26.3 | 62.1 | 67.0 |
| 3 | 33.3 | 66.1 | 75.4 |
| 4 | 37.4 | 68.6 | 78.8 |
| 5 | 40.1 | 70.0 | 81.4 |
| Analysis of solution after precipitation of $Fe^{3+}$ | | | |
| $H_2SO_4$ | 28.2 g/l | 24.5 g/l | 24.7 g/l |
| $Fe^{3+}$ | 17.8 g/l | 8.3 g/l | 4.9 g/l |

It can be seen from these results that the quantity of ferric iron precipitated as ammonium jarosite by the Low-contaminant Jarosite Process can be dramatically increased by neutralizing the solution to give a sufficiently negative acidity using the process of the present invention.

According to the reaction for the precipitation of ammonium jarosite, 6 molecules of $H_2SO_4$ are liberated for each 6 molecules of $Fe^{3+}$ precipitated, when the ammonia is present as the sulphate. i.e. 1.75 grams of acid would be liberated for each gram of ferric iron precipitated. The ratio of acid liberated per gram of ferric iron precipitated for the three tests in this example are:

| Test 1 | = Acid liberated/gram of $Fe^{3+}$ precipitated |
|---|---|
|  | = (final acidity − initial acidity)/(initial $Fe^{3+}$ − final $Fe^{3+}$) |
|  | = (28.2 − 7.3)/(29.7 − 17.8) |
|  | = 20.9/11.9 |
|  | = 1.756 |
| Test 2 | = (24.5 − [−7.5])/(27.7 − 8.3) |
|  | = 32.0/19.4 |
|  | = 1.649 |
| Test 3 | = (24.7 − [−7.9])/(26.4 − 4.9) |
|  | = 32.6/21.5 |
|  | = 1.516 |

It is seen from these results that the amount of acid liberated per gram of ferric iron precipitated by the jarosite precipitation reaction is reduced when the solution before jarosite precipitation has a negative acidity. Thus the process of the present invention has reduced the amount of acid liberated during the precipitation of ferric iron as a jarosite.

EXAMPLE 5

The Use of the Process of the Present Invention to Reduce the Amount of Neutralizing Agent Required When Ferric Iron is Precipitated as a Jarosite from a Sulphate Solution Containing Copper A copper sulphate solution was prepared containing 41.5 g copper per liter, 16.1 g ferric iron per liter, and 8.4 g $H_2SO_4$ per liter to simulate a solution produced by leaching a material containing copper and iron.

To one portion of the solution was added CuO (to simulate a copper oxide calcine) in three stages, at 5 minute intervals, according to the process of the present invention. Throughout the neutralization the solution temperature was held at 65° C. Agitation was provided by a six bladed turbine stirrer.

| Stage 1 | CuO addition = 10 g/l of solution |
|---|---|
|  | After 5 minutes $H_2SO_4$ = 1.9 g/l |
| Stage 2 | CuO addition = 10 g/l of solution |
|  | After 5 minutes $H_2SO_4$ = −3.9 g/l |
| Stage 3 | CuO addition = 2.5 g/l of solution |
|  | After 5 minutes $H_2SO_4$ = −5.9 g/l |

At each stage 2.5 ppm of a nonionic flocculant was added. The pulp was filtered 15 mins after the last CuO addition. The filtrate was found to contain:
Cu = 53.8 g/l
$Fe^{3+}$ = 15.1 g/l
$H_2SO_4$ = −9.6 g/l The filtrate was then heated to 100° C. on a thermostatically controlled hot plate and stirred using a magnetic stirrer. To the filtrate was added 110 g of ammonium jarosite seed material and 11 ml of $NH_4OH$ solution. After holding the solution for 6 hours under reflux the hot pulp was filtered. The filtrate analysed:
Cu = 53.8 g/l
$Fe^{3+}$ = 1.4 g/l
$H_2SO_4$ = 10.4 g/l
$NH_4$ = 1.4 g/l The analysis of the ammonium jarosite filtered off from the solution was:
Cu = 0.34%
Fe = 33.3%
$SO_4$ = 41.6%
$NH_4$ = 2.8%

In this case:
A = 8.4 g/l
$F_1$ = 16.1 g/l
$F_2$ = 0
N = 1.23 g $H_2SO_4$/g CuO
$X_1$ = [(A−3)+0.088 $(F_1+F_2)$]/N = 6 g/l
$X_2$ = [(A−0.1)+2.2 $(F_1+F_2)$]/N = 36 g/l Actual addition of CuO, X = 22.5 g/l.

$Ca(OH)_2$ was added to a second portion of the original copper sulphate solution in two stages, at 63° C. using the stirred reactor.

1st Stage: 10 g $Ca(OH)_2$/l added. Analysis after 5 minutes indicated an acidity of −4.6 g/l.

2nd Stage: 3.3 g $Ca(OH)_2$/l added. Analysis after 5 minutes indicated an acidity of −4.7 g/l.

15 minutes after the second addition of $Ca(OH)_2$ the pulp was filtered.

Analysis of the filtrate was:
Cu = 42.5 g/l
$Fe^{3+}$ = 16.0 g/l
$H_2SO_4$ = −10.0 g/l
pH = 2.02

As before, the filtrate was heated to 100° C., 110 g/l of ammonium jarosite seed material was added, plus 11 ml of $NH_4OH$ solution, and stirred for 6 hours under reflux. The pulp was then filtered and the analysis of the filtrate was:
Cu = 47.5 g/l
$Fe^{3+}$ = 2.2 g/l
$H_2SO_4$ = 12.8 g/l
$NH_4$ = 1.4 g/l Analysis of the washed dried solids was:
Cu = 0.26%
Fe = 33.4%
$SO_4$ = 40.8%
$NH_4$ = 2.7%

In this example:
A = 8.4
$F_1$ = 16.1
$F_2$ = 0
N = 1.32

Thus
$X_1$ = 5 g/l and
$X_2$ = 33 g/l

The actual addition of $Ca(OH)_2$, X = 13.3 g/l

It is seen from these results that if the acidity of the solution is reduced to a sufficiently negative value, no solid neutralizing agent need be added to precipitate the ferric iron as a jarosite. In fact, the ammonia solution added prior to jarosite precipitation as a source of ammonium ions to produce ammonium jarosite neutralized only 6.9 g of $H_2SO_4$/l. In terms of the change in acidities from that in the solutions produced according to the process of the present invention and those in the final solutions after precipitation of ferric iron as ammonium jarosite, the addition of the ammonia solution effected only minor neutralization. Thus the above results show in reality that no neutralizing agent need be added to precipitate the ferric iron as jarosite.

EXAMPLE 6

The Use of the Process of the Present Invention at High Temperature Using a Short Residence Time Portions of a sulphate solution containing zinc sulphate, sulphuric acid, and ferric iron were heated to 90° C., and reacted for short periods of time with added calcine. The solids - liquid separation was performed by flocculating and filtering. The following results were obtained.

|  | Test 1 | Test 2 | Test 3 |
|---|---|---|---|
| Analysis of Sulphate Solution | | | |
| $H_2SO_4$ g/l | 44.0 | 44.0 | 44.0 |
| $Fe^{3+}$ g/l | 35.2 | 35.2 | 35.2 |
| Calcine added (X) g/l | 108.0 | 108.0 | 108.0 |
| Reaction time, seconds | 30 | 60 | 120 |
| Analysis of filtered partially neutralized solution | | | |
| $H_2SO_4$ g/l | −12.8 | −13.6 | −15.6 |
| $Fe^{3+}$ g/l | 33.3 | 33.6 | 33.5 |

It is clear from these results that the reaction is virtually complete after only 30 seconds.

In these tests:
A = 44.0
$F_1$ = 35.2
$F_2$ = 0
N = 0.80
$X_1$ = [(44−3)+0.088 (35.2+0)]/0.80 = 55 g/l
$X_2$ = [(44−0.1)+2.2 (35.2+0)]/0/80 = 152 g/l In a separate test a 500 milliliter portion of the same sulphate solution containing acid and ferric iron was reacted for 60 seconds at 90° C. with 40 g of a coarse-grained calcine. The pulp was flocculated, and the solids were then removed using a screen.

The solution after neutralization contained 36.1 g $Fe^{3+}$ per liter and had a negative acidity of −14.8 grams of $H_2SO_4$ per liter.

In this test:
A = 44
$F_1$ = 35.2
$F_2$ = 0
N = 0.715
$X_1$ = 62 g/l
$X_2$ = 170 g/l
X = 80 g/l

EXAMPLE 7

This Example Shows the Effect of a Long Residence Time in the Process of the Present Invention and the Effect of the Presence of Ammonium Ions Two different sulphate solutions were tested, both containing acid and ferric iron, and one containing ammonium ions. The solutions were mixed at 90° C. with zinc oxide to give approximately the same final negative acidity. The solutions were maintained at nearly 90° C. for a period of 17 hours. Samples were taken and analysed for acidity and ferric iron.

The following results were obtained.

|  | Test 1 | Test 2 |
|---|---|---|
| Analysis of Sulphate Solution | | |
| $H_2SO_4$ g/l | 39.6 | 3.3 |
| $Fe^{3+}$ g/l | 32.7 | 30.8 |
| $NH_4^+$ g/l | 2.6 | Nil |
| Calculation of $X_1$ and $X_2$ | | |
| A | 39.6 | 3.3 |
| N | 1.2 | 1.2 |
| $F_1$ | 32.7 | 30.8 |
| $F_2$ | 0 | 0 |
| $X_1$ g/l | 33 | 3 |
| $X_2$ g/l | 93 | 59 |
| Neutralizing Agent Added (X) g/l | 48 | 15 |
| Analysis after 15 minutes - | | |
| $H_2SO_4$ g/l | −10.5 | −7.8 |
| $Fe^{3+}$ g/l | 29.3 | 29.8 |
| loss of $Fe^{3+}$ g/l | 3.4 | 1.0 |
| Analysis after 30 minutes - | | |
| $H_2SO_4$ g/l | −12.0 | −8.6 |
| $Fe^{3+}$ g/l | 30.0 | 28.0 |
| loss of $Fe^{3+}$ g/l | 2.7 | 2.8 |
| Analysis after 45 minutes - | | |
| $H_2SO_4$ g/l | −8.3 | −7.9 |
| $Fe^{3+}$ g/l | 28.0 | 27.2 |
| loss of $Fe^{3+}$ g/l | 4.7 | 3.6 |
| Analysis after 60 minutes - | | |
| $H_2SO_4$ g/l | −4.7 | — |
| $Fe^{3+}$ g/l | 25.4 | — |
| loss of $Fe^{3+}$ g/l | 7.3 | |
| Analysis after 17 hours - | | |
| $H_2SO_4$ g/l | 20.3 | −2.2 |
| $Fe^{3+}$ g/l | 9.0 | 24.9 |
| loss of $Fe^{3+}$ g/l | 23.7 | 5.9 |
| Identification of solids | Ammonium Jarosite | Carphosiderite |
| Solubility in a hot acid leach solution containing $H_2SO_4$ = 40 g/l, $Fe^{3+}$ = 35 g/l and $NH_4$ = 2.6 g/l at 90° C. | More ferric iron precipitated | No reaction over 6 hrs |

It is seen from these results that at a short residence time, 1 hour or less, the loss of ferric iron from both solutions is similar. However at a long residence time of 17 hours, much more ferric iron is precipitated from the hot acid leach solution if it contains an appreciable concentration of ammonium ions.

In the absence of ammonium ions, the precipitated ferric iron was in the form of carphosiderite. While this carphosiderite dissolved only very slowly in leach solutions of low acid and high ferric iron concentrations, it did not cause further iron precipitation by acting as a seed. However, ammonium jarosite due to its lower solubility compared to carphosiderite, acted as a seed and caused more ferric iron to precipitate from the leach solution. In addition, unlike ammonium jarosite, carphosiderite was found to dissolve in a solution with a high acid, and a low ferric iron concentration, similar to those which would occur early in the hot acid leaching step of the electrolytic zinc process.

EXAMPLE 8

The Effect of Multistage Addition of Flocculant Upon Clarity of Thickener Overflow Solution Compared to Single Stage Flocculant Addition Two series of tests were run in which the two-stage neutralization of a leach solution to a negative free acidity was done in a continuous manner using a train of four, agitated reactor tanks of 40 liter capacity. The feed solution containing $H_2SO_4$ and ferric iron was produced in a hot acid leach in which a leach residue containing zinc ferrite was reacted with a solution containing $ZnSO_4$ and $H_2SO_4$. The flow rate of the feed solution was approximately 4.5 liters per minute, and the neutralization was conducted at 50° C.

Neutral leach pulp and calcine were added to the first stage to reduce the acidity to about 10 grams of $H_2SO_4$ per liter. A slurry of calcine was added to the third tank to reduce the acidity to the desired negative acidity. The pulp was flocculated by the addition of a nonionic flocculant by multistage addition or in a single addition before thickening. The clarity of the overflow from the thickener was monitored by an opacity meter scaled from 0 to 100% with the 100% reading indicating a high solids content in the overflow.

The following results were obtained.

| | Series 1 Total flocculant additions 82 mg/min (18 ppm on a w/v basis). Series 2 Total flocculant additions 18 mg/min (4 ppm on a w/v basis). | | | | | | | |
|---|---|---|---|---|---|---|---|---|
| | Flocculent Addition (mg/min) to | | | | | | Composition of Thickener Overflow | |
| Test No. | Tank 1 | Tank 2 | Tank 3 | Tank 4 | Outflow from Tank 4 | Clarity | $Fe^{3+}$ g/l | $H_2SO_4$ g/l |
| Series 1 | | | | | | | | |
| 1 | 0 | 0 | 41 | 20.5 | 20.5 | 85.7 | 18.6 | −9.7 |
| 2 | 0 | 20.5 | 20.5 | 20.5 | 20.5 | 55.9 | 16.6 | −7.9 |
| 3 | 20.5 | 20.5 | 20.5 | 20.5 | 0 | 42.8 | 14.2 | −5.9 |
| 4 | 0 | 20.5 | 20.5 | 41 | 0 | 62.6 | 15.0 | −6.8 |
| 5 | 0 | 0 | 20.5 | 41 | 20.5 | 61.7 | 15.1 | −7.2 |
| 6 | 0 | 0 | 0 | 82 | 0 | 88.4 | 13.5 | −6.1 |
| 7 | 0 | 0 | 0 | 61.5 | 20.5 | 100* | 12.8 | −6.1 |
| Series 2 | | | | | | | | |
| 8 | 0 | 0 | 4.5 | 9 | 4.5 | 42.1 | 22.3 | −8.3 |
| 9 | 0 | 0 | 0 | 0 | 18 | 80.8 | 22.3 | −8.3 |

*off-scale

It is clear from these results that the best clarity was obtained when flocculant was added to all tanks, and the worst clarities were obtained when the flocculant was added at only one or two points.

However, subsequent test work has shown that addition of flocculant to all tanks is not necessary. By increasing the degree of agitation in the tanks, we have found that satisfactory flocculation can be obtained with fewer addition points. In other words, subsequent test work has established that the number of addition points for flocculant may be minimised by increasing the degree of agitation in the tanks.

It will be clearly understood that the invention in its general aspects is not limited to the specific details referred to hereinabove.

We claim:

1. A process for treatment of an acidic sulphate solution containing ferric iron and at least one non-ferrous metal, prior to removal of ferric iron therefrom, characterised by:

(a) adding at least one neutralizing agent in amounts such that the total amount added lies in the range $X_1$ to $X_2$ grams per liter of the said solution, where—

$X_1[(A-3.0)+0.088\ (F_1+F_2)]/N$, $X_2[(A-0.1)+2.20\ (F_1+F_2)]/N$,

A = acidity (expressed as grams per liter) of the said solution,
   $F_1$ = ferric iron (grams per liter) in the said solution,
   $F_2$ = ferric iron (grams per liter) dissolved from the neutralizing agent or agents added during neutralization, and
   N = the weighted average amount of acid which can be neutralized by one gram of the neutralizing agent or agents added during neutralization, and (b) separating off from the solution any residue or undissolved neutralizing agent remaining after neutralization, thereby producing a solution possessing a negative acidity and still containing substantially all the dissolved ferric iron in solution and subsequently removing ferric iron with the generation of less acid compared to that generated from solutions partially neutralized according to the prior art.

2. A process according to claim 1, in which the initial solution contains between 0.1 and 250 grams of acid per liter, 0.1 and 100 grams of ferric iron per liter, and more than 2 grams of a valuable non-ferrous metal or metals per liter.

3. A process according to claim 2, in which the initial solution is a sulphate solution containing 0.1 to 250 grams of acid per liter, 0.1 to 100 grams of ferric iron per liter, and at least 20 grams of zinc per liter, as well as non-ferrous metal impurities.

4. A process according to claim 3, in which the initial solution is a sulphate solution derived from the hot acid leaching step of the electrolytic zinc process.

5. A process according to claim 1, in which at least one of the neutralizing agents is drawn from a group consisting of zinc oxide, zinc oxide calcine, calcined zinc sulphide, calcined zinc sulphide concentrate, basic zinc sulphate, zinc silicate, smithsonite, an oxidised zinc ore, lime, limestone, dolomite, solids from the neutral leach step in the electrolytic zinc process and releached solids from the aforesaid neutral leach step.

6. A process according to claim 1, in which the neutralization is operated in one stage.

7. A process according to claim 1, in which the neutralization is operated in more than one stage prior to separation of the solids from the solution.

8. A process according to claim 6, in which different neutralizing agents are added to one or more stages of neutralization.

9. A process according to claim 7, in which different neutralizing agents are added to the different stages of neutralization.

10. A process according to claim 7, in which more than one neutralizing agent is added to at least one of the different stages of neutralization.

11. A process according to claim 7, in which the solids from the neutral leaching step of an electrolytic zinc process and zinc oxide calcine are used as the neutralizing agents and are added together to a first stage of the neutralization process, and at least one member of the group consisting of zinc oxide, zinc oxide calcine, and calcined zinc sulphide and is used as the neutralizing agent in a second stage.

12. A process according to claim 7, in which the solids are separated off between two of the stages of neutralization.

13. A process according to claim 7, in which the solids from a later stage of neutralization are recycled as a neutralizing agent to an earlier stage of neutralization.

14. A process according to claim 1, in which the concentrations of acid A and ferric iron $F_1$ are adjusted to allow for the amounts present in other solutions added to the initial solution before or during neutralization.

15. A process according to claim 1, in which the neutralization is carried out at a temperature in the range of 15° C. to the boiling point of the solution.

16. A process according to claim 1, in which the acidity after neutralization lies in the range 0 to $-50$ grams of acid per liter.

17. A process according to claim 16, in which the acidity after neutralization lies in the range 0 to $-30$ grams of $H_2SO_4$ per liter.

18. A process according to claim 1, in which a flocculating agent is added before, during or after neutralization to facilitate separation of solids from the solution.

19. A process according to claim 18, in which the flocculating agent used is a nonionic flocculant.

20. A process according to claim 18, in which the neutralization is carried out in two or more stages and a flocculating agent is added to more than one of the stages.

21. A process according to claim 1, in which residues or undissolved neutralizing agent or agents remaining after neutralization are separated from the solution by at least one of the procedures of the group consisting of settling, thickening, hydrocycloning, centrifuging, filtering, and screening.

22. A process according to claim 1, in which the neutralization is carried out batchwise.

23. A process according to claim 1, in which the neutralization is carried out in a continuous manner.

24. A process according to any one of claim 1, in which the neutralization is carried out in more than one stage and at least one stage is carried out batchwise and at least one stage is carried out in a continuous manner.

25. A process according to claim 1, in which the solution after neutralizing is treated to precipitate the ferric iron as a jarosite with the addition of a neutralizing agent to aid precipitation.

26. A process according to claim 1, in which the solution after neutralizing is treated to precipitate the ferric iron as a jarosite without the addition of a neutralizing agent.

27. A process according to claim 1, in which solution after neutralizing is treated to precipitate the ferric iron as ferric oxide or as a hydroxy compound of ferric iron.

28. A process according to claim 1, in which the solution after neutralizing is treated to remove the ferric iron by solvent extraction.

* * * * *

UNITED STATES PATENT AND TRADEMARK OFFICE
CERTIFICATE OF CORRECTION

PATENT NO. : 4,515,696
DATED : May 7, 1985
INVENTOR(S) : MATTHEW et al

It is certified that error appears in the above-identified patent and that said Letters Patent is hereby corrected as shown below:

Column 4, lines 42-45, rewrite equation to read as follows:

--$M_2SO_4 + 3Fe_2(SO_4)_3 + 12H_2O = 2MFe_3(SO_4)_2(OH)_6 + 6H_2SO_4$.--

Column 4, line 45, change "$NH_4^{30}$", to --$NH_4^+$--.

Column 8, line 54, change "$NH_4^{30}$", to --$NH_4^+$--.

Column 11, line 61, change "are liquids" to --and liquids--.

Column 23, lines 60-65, change the equations to read:

--$X_1 = [(A - 3.0) + 0.088 (F_1 + F_2)]/N$--

--$X_2 = [(A - 0.1) + 2.20 (F_1 + F_2)]/N$--.

Signed and Sealed this

Seventh Day of January 1986

[SEAL]

Attest:

DONALD J. QUIGG

Attesting Officer    Commissioner of Patents and Trademarks